United States Patent [19]
Werther

[11] 3,912,413
[45] Oct. 14, 1975

[54] BORING BAR

[76] Inventor: Karl G. Werther, 1409 Hinnen Ave., Hacienda Heights, Calif. 91745

[22] Filed: Feb. 25, 1974

[21] Appl. No.: 445,441

Related U.S. Application Data

[63] Continuation-in-part of Ser. No. 261,526, June 9, 1972, Pat. No. 3,841,785.

[52] U.S. Cl. ............................... 408/143; 408/197
[51] Int. Cl.² ......................................... B23B 29/02
[58] Field of Search ........... 408/143, 197, 186, 240, 408/239, 238, 226; 29/96

[56] References Cited
UNITED STATES PATENTS

| | | | |
|---|---|---|---|
| 79,684 | 7/1868 | Pratt | 29/96 |
| 2,426,359 | 8/1947 | Lankheet | 408/143 |
| 3,164,041 | 1/1965 | Carlstedt | 408/239 X |
| 3,187,408 | 6/1965 | Titterud | 408/197 X |
| 3,546,759 | 12/1970 | Sirola | 29/96 X |
| 3,663,116 | 5/1972 | Muller et al. | 408/143 |

FOREIGN PATENTS OR APPLICATIONS

| | | | |
|---|---|---|---|
| 593,812 | 10/1947 | United Kingdom | 408/239 |

*Primary Examiner*—Gil Weidenfeld
*Attorney, Agent, or Firm*—Lyon & Lyon

[57] ABSTRACT

Described herein is a boring bar having a cylindrical body, the rearward portion of which is adapted to be held in a boring head. The forwardly extending portion of the bar has a longitudinal chamber therein in which is disposed a stiffening member. Forward of the chamber is a slot which extends through the forward portion of the bar and terminates any channel at the forward end of the bar. A boring bit is carried in the forwardly disposed channel and is held therein by drawing the two sides of the bifurcated portion of the bar inwardly of the slot.

7 Claims, 5 Drawing Figures

BORING BAR

This is a continuation-in-part of U.S. Pat. application Ser. No. 261,526 for Boring Bar filed June 9, 1972 now U.S. Pat. No. 3,841,785, issued on Oct. 15, 1974.

BACKGROUND OF THE INVENTION

In general terms, a boring operation consists of a jig bore or boring machine turning a boring bar within a hole about either a central or eccentric axis. The boring bar carries a cutting or boring bit in its forward end, which bit is constructed of hard steel or carbide. The cutting edge of the bit is then directed about the cylindrical wall of the trough or hole, cutting and finishing the hole to exacting tolerances. The boring bars used in such an operation could be classified into two groups, one having an integral bar and bit, wherein the bit cut out is shaped on the forwardly extended end of the bar and those having replaceable bits. The latter group of boring bars carries the bits in the forward end of the bar and secures the bit by means of a pressing plate which is urged against the bit by a screw member. The use of a pressing plate to secure the boring bit in the bar prevents a sufficient reduction in the size of the boring bar for use in small blind holes, such as those under a quarter of an inch. Therefore, in boring out small holes, it is necessary to use an integral bar and bit. The disadvantage of such a bar is that breakage or damage to the bit necessitates replacement of the entire bar.

A second problem associated with both classes of conventional boring bars is that of vibration. Because the boring tool is used to cut to extremely small tolerances any vibration in the bar necessarily limits the precision of the cutting operation.

SUMMARY OF THE INVENTION

Briefly, the invention comprises a cylindrical body member having a forwardly extending portion which carries a boring bit near the end thereof in a channel which is angled with respect to the body member and extends therethrough. A slot bifurcates a section of the forwardly extending portion and terminates in the angled channel, thereby providing two surfaces which can be pressed together by means of a small allen screw or the like to secure the cutting bit. A stiffening member is disposed within the forward portion of the bar to further reduce vibration during use of the bar.

It is therefore the principal object of this invention to provide an improved boring bar.

It is another object of this invention to provide a boring bar with a replaceable bit which is adaptable for use in smaller areas than the boring bars heretofore available.

It is further an object of this invention to provide a boring bar which undergoes less vibration during the boring operation than boring bars heretofore available.

It is still a further object of this invention to provide an improved boring bar which is adapted to carry conventional boring bits.

These and other objects and advantages of the present invention will become apparent from the following detailed description taken in conjunction with the accompanying drawings.

IN THE DRAWINGS

Figure 1:
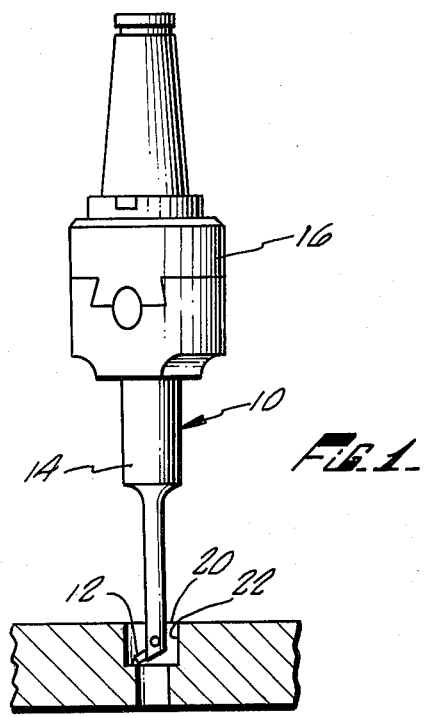
FIG. 1 is a plan view of a boring operation showing the boring bar mounted in a boring machine and boring out a hole about eccentric axis.
Figure 2:
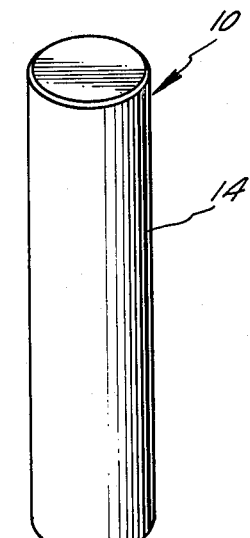
FIG. 2 is an isometric elevation of the boring bar with the boring bit and securing nut extended therefrom.

Referring now in detail to the drawings, the boring operation is shown in FIG. 1 wherein the boring bar 10 has a boring bit 12 secured in the lowermost end thereof, while the upper base 14 of the bar 10 is mounted in a boring head 16 which in turn is carried by a jig bore or a boring machine (not shown). The boring machine then rotates the boring bar 10 about the central axis of hole 20 which is being bored and also about the central axis of the boring bar 10, thereby exactly following the cylindrical wall 22 of the hole, while maintaining the cutting edge 24 of the bit (see FIG. 4) in continual contact therewith.

Figure 3:
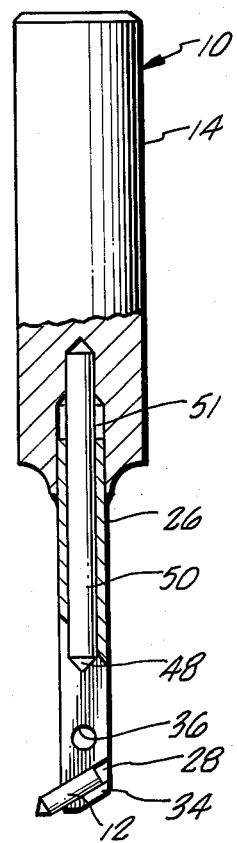
FIG. 3 is a plan view of the boring bit with the lower portion thereof broken away.

The boring bar 10 has a cylindrical body defining a base portion 14 and a forwardly extending portion 26. As shown in FIGS. 1–4, the forwardly extending portion 26 is of a reduced cross-sectional area, which is illustrative of the boring bars used for work in smaller holes. With larger bars, such as that shown in FIG. 5, the bar is of a fairly uniform cross-sectional area, as the wide forwardly extending portion of such a bar would not interfere with the boring of the larger hole. The forward end of the forwardly extending portion 26 has a cylindrical channel 28 therein which extends through the forward portion and is angularly disposed with respect thereto, as shown in FIG. 3. The angularly disposed channel 28 is adapted to hold the boring bit 12 therein. As noted above, the boring bit has a cutting edge 24 thereon which is located at the extended edge thereof to be in continual contact with the wall of the hole being sized thereby.

A slot 30 is cut through the forwardly extending portion 26 of the boring bar from a point below the base portion 14 and extending to channel 28, thereby bifurcating that length of the forward portion 26 of the bar into two pressing members 31 and 32, which are joined together in an angled wall portion 34 about channel 28. The angled wall 34 is the forwardmost portion of the boring bar 10. As shown in the drawings, the upper end of the slot 30 extends at an angle with respect to the bar. This is sloely a result of a manufacturing technique and does not affect the functioning of the slot. An aperture 36 is positioned in the forward portion 26 of the boring bar above channel 28 and extending through pressing members 31 and 32, perpendicular to the slot 30 therebetween. Aperture 36 has an enlarged head portion 38 in pressing member 30 and a threaded body portion in pressing member 31, which are adapted to receive a threaded allen screw 42 having an enlarged head portion 44. While the boring bit 12 is placed within channel 28 and screw 42 tightened within aperture 36, the enlarged head portion 44 of the screw draws the two pressing members 31 and 32 about the channel 28 reducing the radial arch of channel wall 34 and securing the boring bit 12 within the boring bar 10.

Disposed rearwardly of slot 30 is a longitudinally extending chamber 48. Chamber 48 communicates with slot 30 at its forward end and extends into the base portion of 14 at the rearward end thereof. A solid carbide bar 50 or other stiffening bar constructed of a material of a minimum deflection is disposed within chamber 48. This stiffening member in the forward portion of the bar together with the slot and pressing member configuration has been found to greatly reduce the vibration of the boring bar during the boring process and thereby increase the precision of the boring process. In addition, this configuration allows for a reduction in size of the forward end of the boring bar thereby rendering the bar capable of a smaller boring operation than were heretofor possible with the detachable bit type bar. In constructing the bar, both the carbide bar 50 and rearward end of the forwardly extending portion 26 are press fit within their respective chambers. As shown in FIG. 3, an enlarged chamber 51 is provided in the forward portion of the base 14 of the bar for receiving the forward reduced diameter portion 26. The juncture of the base and forward portion 26 is then brazed.

Figures 4, 5:
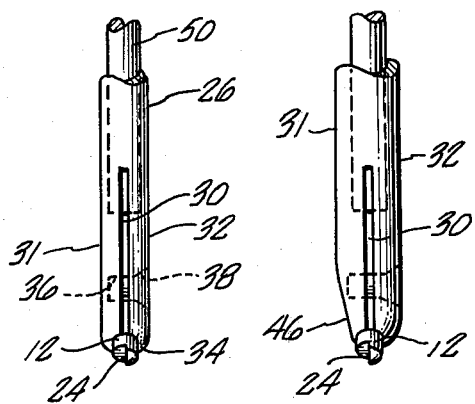
FIG. 4 is an elevation of the forwardly extending portion of the boring bit, showing the stiffening member and the relation of the slot, boring bit and securing nut.
FIG. 5 is an elevation of the forwardly extending portion of a larger boring bit illustrating the recess area near the forward end thereof.

Finally, as shown in FIG. 5, a recessed area 46 is provided in the forwardly extending portion of the bar to allow the metal chips which are cut during the boring operations to flow by the forwardly extending portion of the bar and out of the hole being bored thereby preventing the binding of the boring bar and scarring of the hole.

Various changes and modifications may be made in carrying out the present invention without departing from the scope and spirit thereof. Insofar as these changes and modifications are within the purview of the appended claims they are to be considered as part of the invention.

What is claimed is:

1. A boring bar for mounting in a boring machine and adapted to carry a boring bit comprising a cylindrical body member having a forwardly axially extending portion, said forwardly axially extending portion having a longitudinal axis, a continuous end portion and a transverse channel extending therethrough, said channel being positioned adjacent to and enclosed by the continuous end portion of said forwardly extending portion and being adapted to hold said boring bit therein, a slot parallel to and extending through said forwardly extending portion and merging with said channel, a longitudinal chamber disposed rearwardly of said slot, a stiffening member being supported from said cylindrical body member and being disposed within said chamber for reducing vibration and means for compressing said forwardly extending portion about said slot thereby maintaining said bit within said channel, said means being positioned rearwardly of said channel along said forwardly extending portion.

2. The combination of claim 1 wherein said compressing means comprises an aperutre in said forwardly extending portion, said aperture being substantially perpendicularly disposed with respect to said longitudinal axis of said forwardly disposed portion and screw means adapted to be postioned within said aperture and for threaded engagement with said forwardly extending portion of said body member whereby upon turning said screw means positioned within said aperture, said forwardly extending portion is compressed about said slot.

3. The combination of claim 1 wherein the portion of said aperture being disposed on one side of said slot is adapted for threaded engagement with said screw means, the portion of said aperture being disposed across said slot from said first portion having an enlarged head portion and said screw member having an enlarged head portion, said head portion of said screw member being adapted to be positioned within said enlarged head portion of said aperture.

4. The combination of claim 1 wherein said longitudinal chamber extends from said slot at its forward end into said cylindrical body member and said stiffening member comprises a rod constructed of a minimum deflection material.

5. A boring bar for mounting in a boring machine and adapted to carry a boring bit comprising a cylindrical body member having a forwardly axially extending portion, said forwardly extending portion having a longitudinal central axis, a continuous end portion and a channel extending therethrough adapted to hold said boring bit therein, said channel being positioned adjacent the forward end of said forwardly extending portion and making an obtuse angle with respect to the central axis of said forwardly extending portion, a slot parallel to and passing through the longitudinal axis of said forwardly extending portion and merging with said channel, said slot bifurcating a portion of said forwardly extending portion into a pair of pressing members, said pressing members being joined at their forwardmost end in a wall of said angularly disposed channel, an aperture in said forwardly extending portion extending substantially through said press member and being perpendicularly disposed with respect to said longitudinal axis of said forwardly extending portion, a longitudinal chamber disposed rearwardly of said slot and extending into said body member, a stiffening rod constructed of a minimum deflection material being supported from said cylindrical body member and being disposed within said chamber for reducing vibration, and screw means adapted to be positioned within said aperture and for threaded engagement with said forwardly extending portion whereby upon tightening said screw means, said pressing members are drawn together inwardly of said slot and about said channel, reducing the radial axis of said channel wall and thereby securing said bit within said channel.

6. The combination of claim 5 including a recessed area in the external surface of said forwardly extending portion of said body member by which metal chips may pass during the boring operation.

7. The combination of claim 5 wherein said stiffening rod is constructed of carbide.

* * * * *